(12) United States Patent
Lin

(10) Patent No.: US 12,114,746 B2
(45) Date of Patent: Oct. 15, 2024

(54) KICKSTAND STRUCTURE PROVIDED ON A PROTECTIVE CASING FOR TERMINAL DEVICE

(71) Applicant: Guangzhou Roiskin Technology Company, Guangdong (CN)

(72) Inventor: Yuying Lin, Guangdong (CN)

(73) Assignee: Guangzhou Roiskin Technology Company, Guangzhou (CN)

( * ) Notice: Subject to any disclaimer, the term of this patent is extended or adjusted under 35 U.S.C. 154(b) by 347 days.

(21) Appl. No.: 17/724,469

(22) Filed: Apr. 19, 2022

(65) Prior Publication Data

US 2023/0284761 A1 Sep. 14, 2023

(30) Foreign Application Priority Data

Mar. 8, 2022 (CN) .......................... 202220510394.5

(51) Int. Cl.
*A45C 13/00* (2006.01)
*A45C 11/00* (2006.01)

(52) U.S. Cl.
CPC ............ *A45C 13/002* (2013.01); *A45C 11/00* (2013.01); *A45C 2011/002* (2013.01); *A45C 2011/003* (2013.01); *A45C 2200/15* (2013.01)

(58) Field of Classification Search
CPC . A45C 13/002; A45C 11/00; A45C 2011/002; A45C 2011/003; A45C 2200/15; A45C 13/00; A45C 13/005; A45C 13/007; A45C 13/001; Y02E 60/10; H04W 88/02; H04W 52/0229; H04W 72/0453; H04W 72/1263; H04W 72/23; H04W 52/0216; H04W 52/0219; H04W 52/0235;
(Continued)

(56) References Cited

U.S. PATENT DOCUMENTS 10,171,121 B1 * 1/2019 Miller et al. .......... H04B 1/3877
2012/0088559 A1 * 4/2012 McSweyn et al. ........ 455/575.1
(Continued)

FOREIGN PATENT DOCUMENTS

CA 3066560 A1 * 7/2021 ............. G06F 1/166
EP 2709377 A1 * 3/2014 ............. H04R 1/026
(Continued)

OTHER PUBLICATIONS

Kim Dae Young (KR 20170142892 A) >>> Kickstand for Protective Case (see title) (Year: 2017).*

*Primary Examiner* — Meless N Zewdu
(74) *Attorney, Agent, or Firm* — Hemisphere Law, PLLC; Zhigang Ma

(57) ABSTRACT

The invention discloses a protective sleeve for a terminal device, The protective casing comprises a fixing structure and a support structure. The kickstand assembly comprises a pull kickstand and an abutting kickstand, a first slot and a second slot are formed in one end of the match groove, a tail end of the first slot is communicated with the second slot, a rotating slot is formed in the other end of the match groove, the pull kickstand has an end disposed in the rotating slot and an end hinged to the middle of the abutting kickstand, one end of the pull kickstand is slidably disposed in the first slot or the second slot. In use, the pull kickstand is pulled to drive the abutting kickstand to slide in the first slot and the second slot alternately to realize a support and storage effect.

10 Claims, 6 Drawing Sheets

(58) Field of Classification Search
CPC ...... H04W 76/28; H04M 1/0206; H04B 1/02; H04B 1/03; H04B 1/034; H04B 1/0343; H04B 1/0346; G06F 1/16; G06F 1/1601; G06F 1/1607; H04L 5/0098; H04L 5/00
See application file for complete search history.

(56) References Cited

U.S. PATENT DOCUMENTS

| | | | |
|---|---|---|---|
| 2012/0199501 A1* | 8/2012 | Le Gette et al. | 206/45.24 |
| 2013/0088813 A1* | 4/2013 | Su et al. | 361/16 |
| 2013/0229773 A1* | 9/2013 | Siddiqui et al. | H05K 5/0234 |
| 2013/0286623 A1* | 10/2013 | Slipy et al. | 361/807 |
| 2014/0061084 A1* | 3/2014 | Westrup et al. | A45C 13/02 |
| 2014/0079266 A1* | 3/2014 | Szymanski et al. | H04R 1/026 |
| 2014/0085777 A1* | 3/2014 | Yeh et al. | 361/679.01 |
| 2014/0158583 A1* | 6/2014 | Hassett | H05K 5/03 |
| 2015/0189771 A1* | 7/2015 | Krohn et al. | H05K 5/0204 |
| 2015/0296060 A1* | 10/2015 | Gu | H04M 1/0235 |
| 2016/0308571 A1* | 10/2016 | Chiang et al. | H04B 1/3888 |
| 2017/0230072 A1* | 8/2017 | Kim et al. | H04B 1/3888 |
| 2021/0048843 A1* | 2/2021 | Lin et al. | G06F 1/166 |
| 2021/0057928 A1* | 2/2021 | Tivas | H02J 7/0052 |
| 2021/0315340 A1* | 10/2021 | Whitten et al. | A45C 11/00 |

FOREIGN PATENT DOCUMENTS

| | | | | |
|---|---|---|---|---|
| WO | WO 2014209343 A1 * | 12/2014 | | G06F 1/16 |
| WO | 201514664 A * | 4/2015 | | G06F 1/16 |
| WO | WO 2016032529 A1 * | 3/2016 | | G06F 1/16 |
| WO | WO 2016085439 A1 * | 6/2016 | | G06F 1/16 |
| WO | WO 2019009885 A1 * | 1/2019 | | G06F 1/16 |
| WO | WO 2019017877 A1 * | 1/2019 | | G06F 1/16 |

* cited by examiner

KICKSTAND STRUCTURE PROVIDED ON A PROTECTIVE CASING FOR TERMINAL DEVICE

CROSS REFERENCE TO RELATED APPLICATIONS

The present application claims the priority and benefits of Chinese patent application No. 202220510394.5 filed on Mar. 8, 2022. The entirety of the above-mentioned patent application is hereby incorporated by reference herein and made a part of this specification.

BACKGROUND OF THE INVENTION

1. Technical Field

The invention belongs to the field of parts of terminal devices, and particularly, relates to a protective casing for a terminal device.

2. Description of Related Art

Terminal devices, as common electronic devices, are easy to carry and popular with customers. The terminal devices are generally held by hand when used. However, in some circumstances, the terminal devices need to be supported on a desk to be used. At present, the terminal devices are supported on a desk by means of a mating part such as a kickstand. Due to the fact that the mating part has a large size and is difficult to carry, users do not carry the kickstand when going outside. Moreover, the terminal devices need to be protected against accidental falling in use, which may otherwise be damaged. A protective device for supporting and protecting the terminal devices is not available yet on the market.

BRIEF SUMMARY OF THE INVENTION

The main objective of the invention is to provide a protective casing for a terminal device, comprising:
  a fixing structure for fixing a terminal device, wherein a match groove is formed in a back of the fixing structure; and
  a support structure comprising a kickstand structure, wherein the kickstand structure is disposed in the match groove and comprises a pull kickstand and an abutting kickstand, a first slot and a second slot are formed in a side wall of an end of the match groove, a length of the first slot is greater than that of the second slot, a tail end of the first slot is communicated with the second slot, a rotating slot is formed in a side wall of another end of the match groove, the pull kickstand has an end disposed in the rotating groove and an end hinged to a middle of the abutting kickstand, an end of the abutting kickstand is slidably disposed in the first slot or the second slot, and the pull kickstand pulls the abutting kickstand to move in the first slot or the second slot.

A protective casing for a terminal device, a torsion spring is disposed at an end, connected to the abutting kickstand, of the pull kickstand, and has an end connected to the pull kickstand and an end connected to the abutting kickstand.

A protective casing for a terminal device, the rotating slot has a sliding-in end and a rotating end, the sliding-in end is disposed on a side wall of the match groove and is communicated with the rotating end, and the pull kickstand is rotatably disposed at the rotating end.

A protective casing for a terminal device, wherein the first slot and the second slot are arranged in parallel, a length of the first slot is greater than that of the second slot, and a slope towards the first slot is disposed at a tail end of the second slot.

A protective casing for a terminal device, wherein the fixing structure comprises an inner chuck for clamping the terminal device and an outer chuck for clamping the inner chuck, a through hole is formed in the inner chuck and is step-like, the support structure further comprises a rotary plate assembly, the rotary plate assembly comprises a driving plate and a driven plate, the driven plate is disposed in the through hole, abuts against the through hole and penetrates through the inner chuck and the outer chuck to be connected to the driving plate, and the match groove is formed in the driving plate.

A protective casing for a terminal device, wherein limit grooves are formed in a side wall of the through hole in a ring array, and limit arms are disposed an on outer edge of the driven plate and are clamped in the limit grooves.

A protective casing for a terminal device, wherein the driving plate and the driven plate are connected through bolts.

A protective casing for a terminal device, wherein buffer gaskets are disposed between the inner chuck and the outer chuck and are located above and below the through hole.

A protective casing for a terminal device, wherein the driving plate is further provided with grip straps, and two ends of the grip straps are disposed on two sides of the match groove respectively.

A protective casing for a terminal device, wherein two said grip straps are arranged and are provided with hook and loop fastener.

One of the above-mentioned technical solutions of the invention has at least one of the following advantages or beneficial effects:

In this application, a fixing structure is used to protect a terminal device, and an abutting kickstand is used to support the fixing structure; in use, a pull kickstand is pulled to drive the abutting kickstand to slide in a second slot, and when the abutting kickstand abuts against a tail end of the second slot, the abutting kickstand, a deck and the fixing structure form a triangle to support and stabilize the terminal device; and when the pull kickstand is pulled again, the abutting kickstand slides into a first slot from the second slot, and the abutting kickstand and the pull kickstand are hidden in a match groove. After being folded, the protective casing has the advantages of being easy to carry and small in spatial size.

BRIEF DESCRIPTION OF THE SEVERAL VIEWS OF THE DRAWINGS

The invention will be further described below in conjunction with accompanying drawings and embodiments.

DETAILED DESCRIPTION OF THE INVENTION

Several different embodiments or examples are provided below to implement different solutions of the invention.

Figure 1:
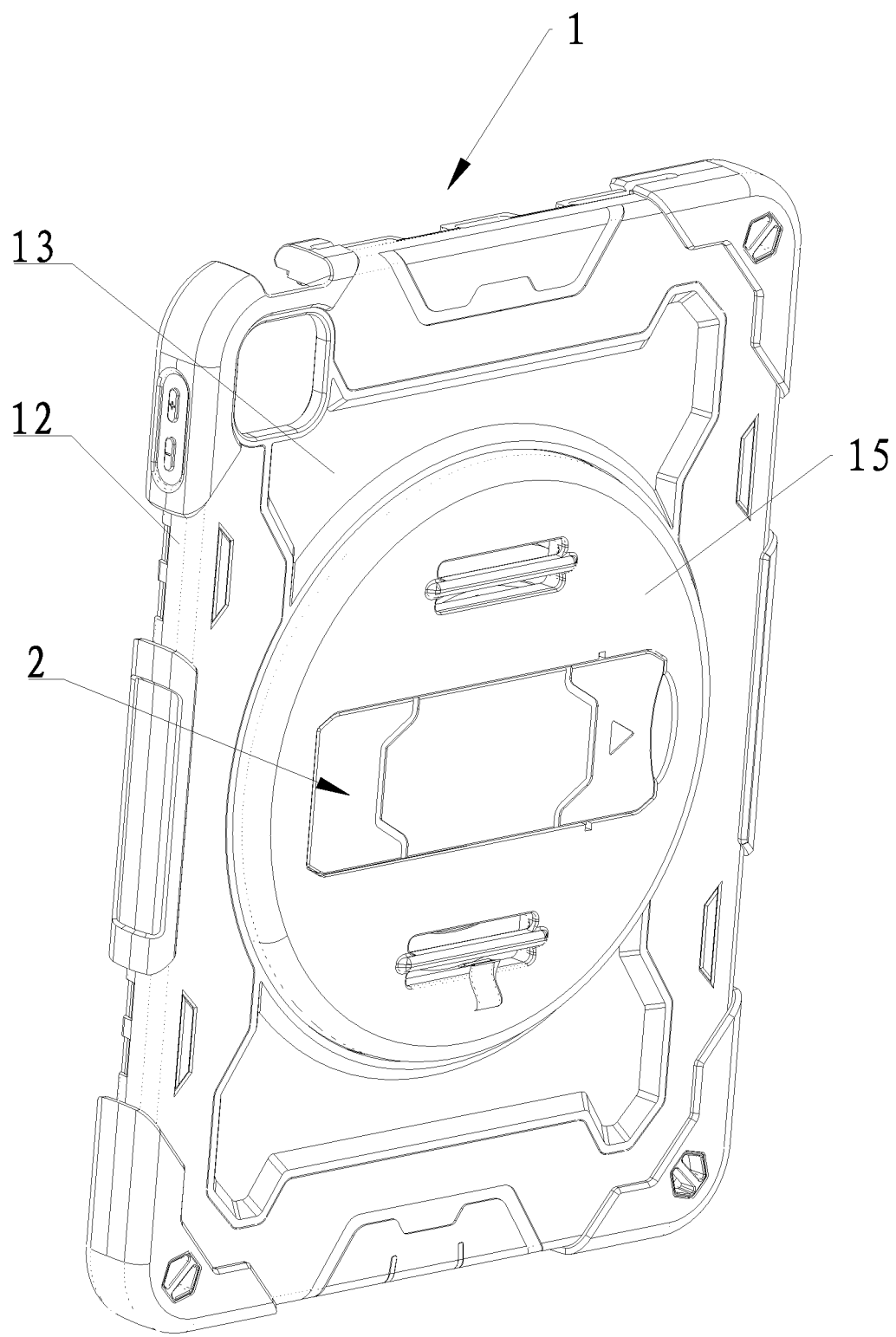
FIG. 1 is a first view of the invention.
Figure 2:
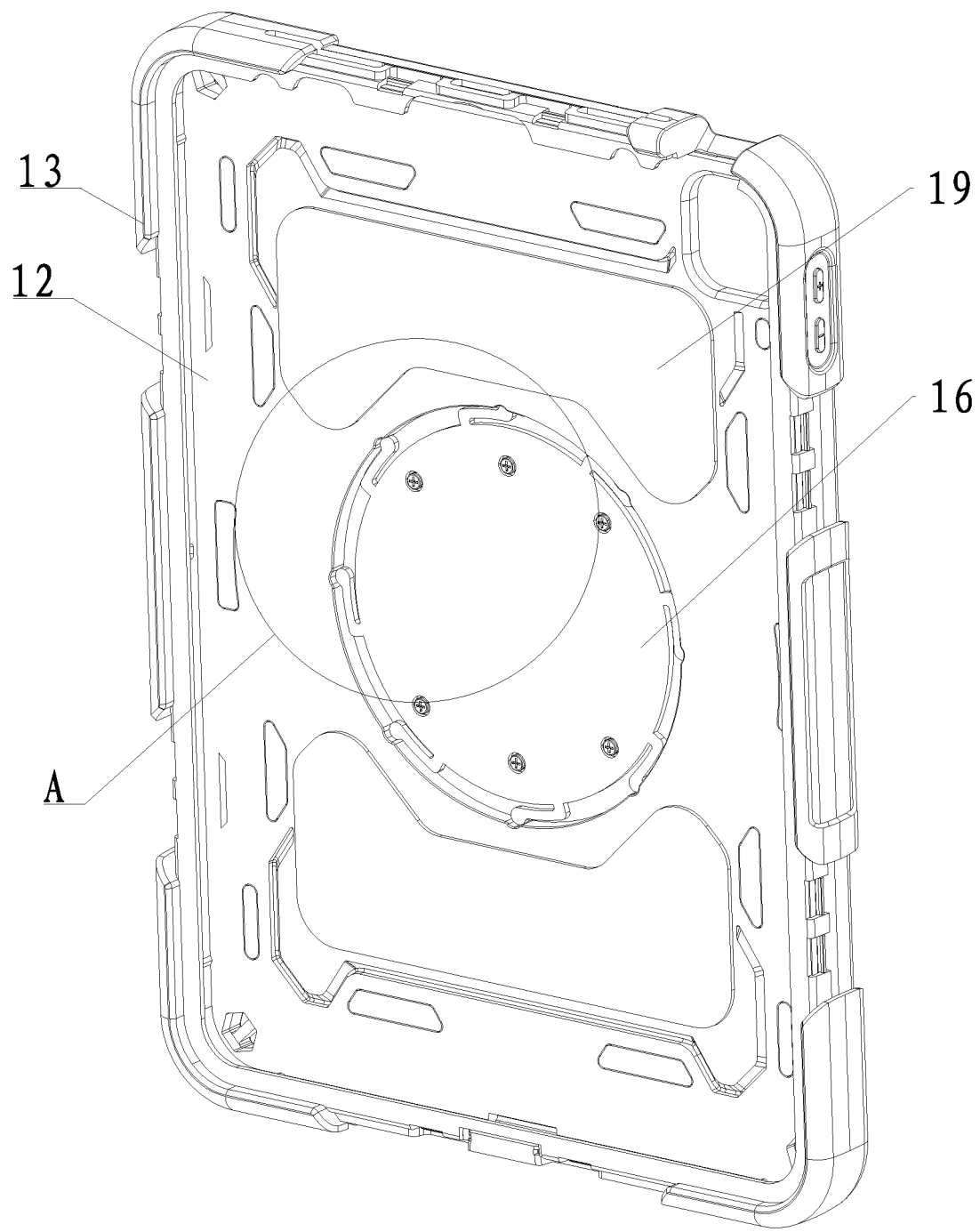
FIG. 2 is a second view of the invention.
Figure 3:
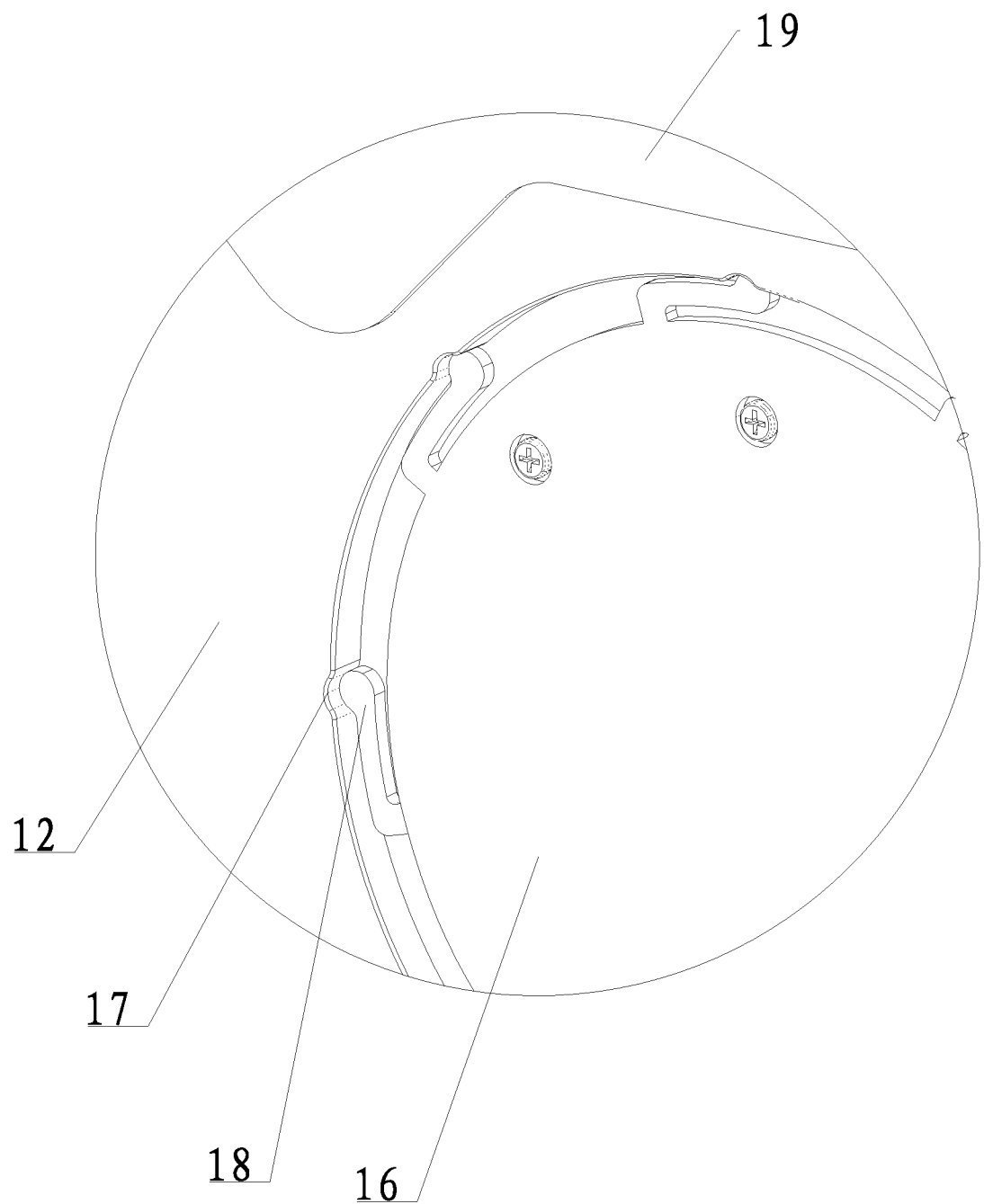
FIG. 3 is an amplified view of part A in FIG. 2.
Figure 4:
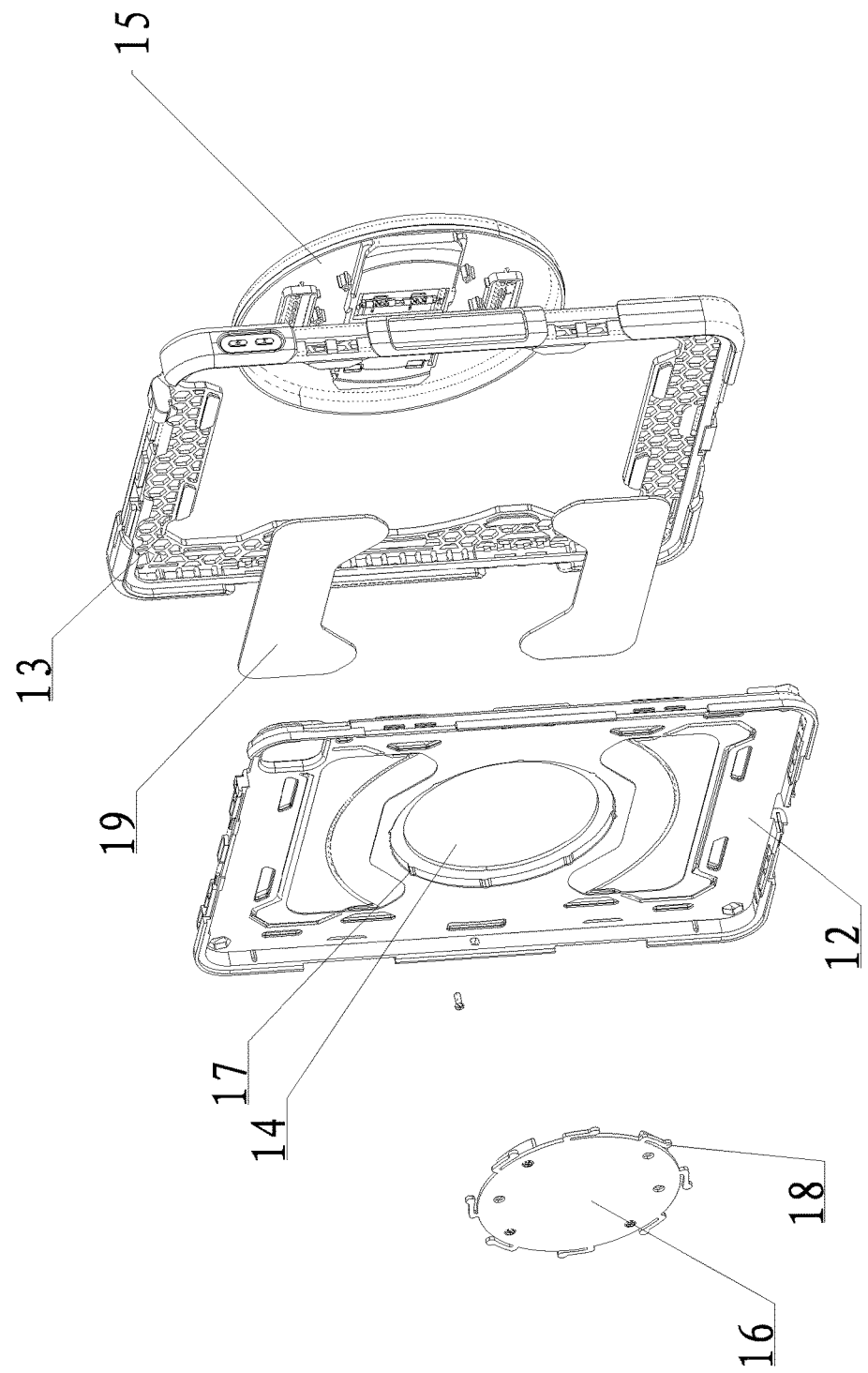
FIG. 4 is a first exploded view of the invention.
Figure 5:
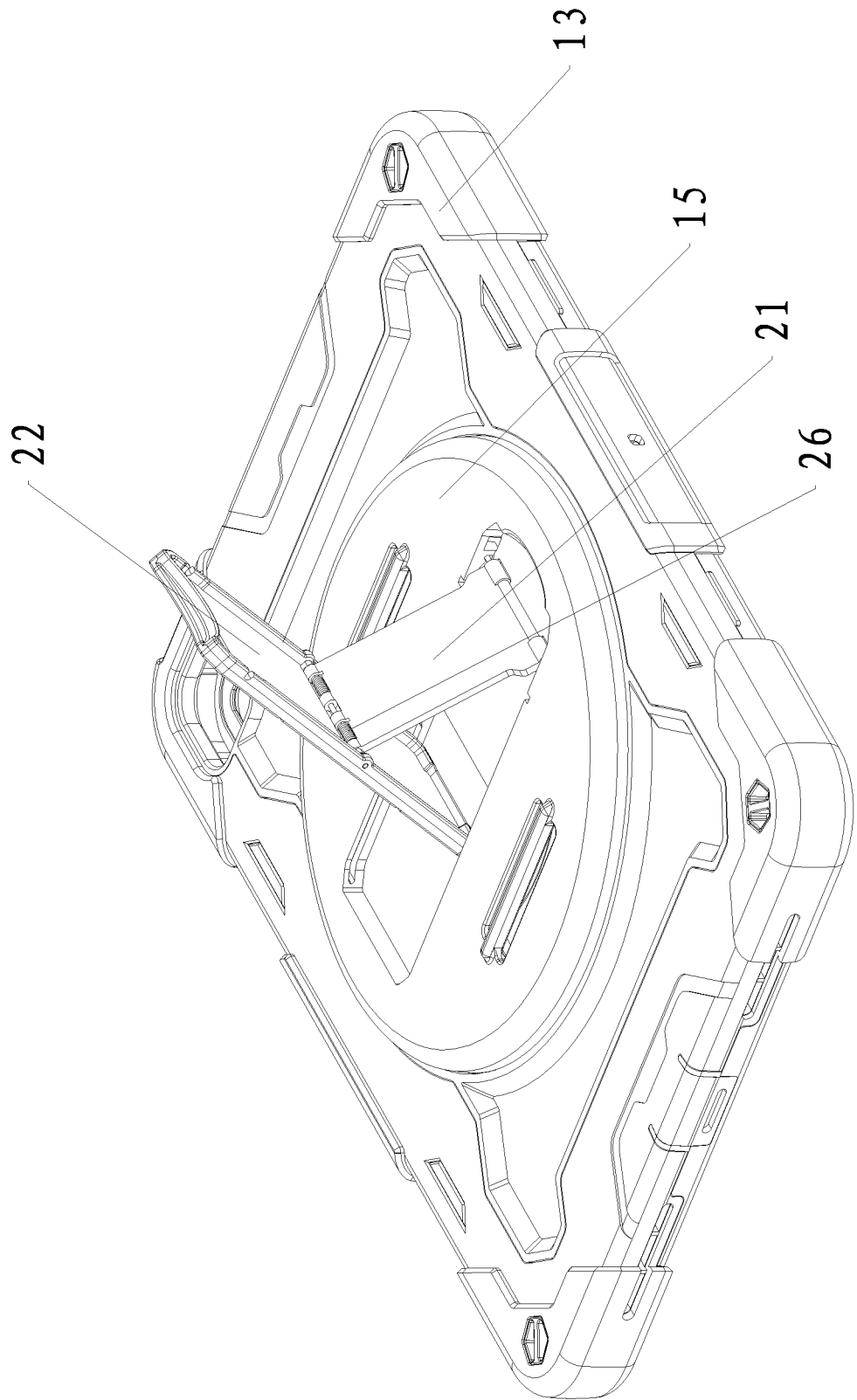
FIG. 5 is a structural diagram of a driving plate.
Figure 6:
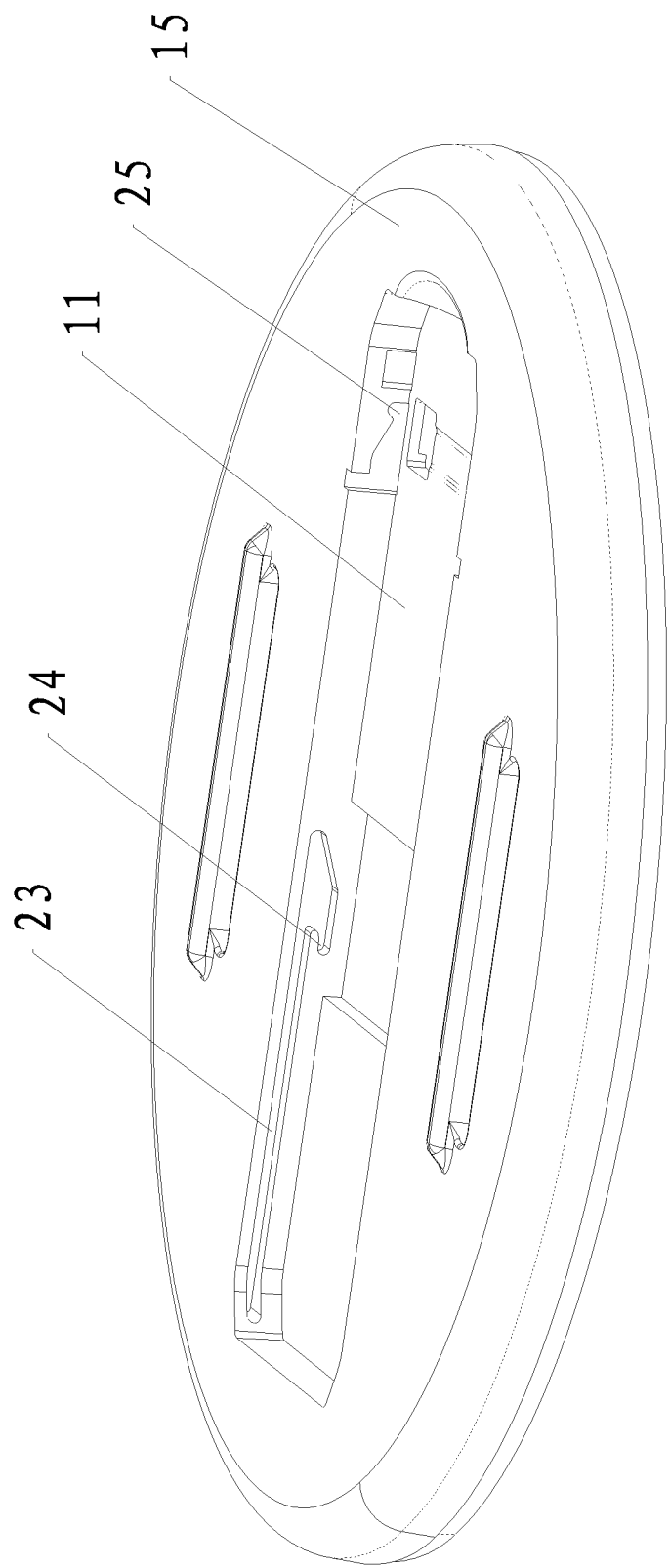
FIG. 6 is a structural diagram of a turntable structure.

Referring to FIG. 1 to FIG. 6, a protective casing for a terminal device comprises a fixing structure 1 and a support structure 2, wherein the fixing structure 1 is used to fix a terminal device, and the support structure 2 comprises a kickstand assembly and a rotary plate assembly; and the kickstand assembly comprises a pull kickstand 21 and an abutting kickstand 22, and the rotary plate assembly comprises a driving plate 15 and a driven plate 16. A match groove 11 is formed in a back of the fixing structure 1, and the kickstand assembly is disposed in the match groove 11. Specifically, a first slot 23 and a second slot 24 are formed in a side wall of one end of the match groove 11, the length of the first slot 23 is greater than that of the second slot 24, and a tail end of the first slot 23 is communicated with the second slot 24. A rotating slot 25 is formed in a side wall of the other end of the match groove 11, one end of the pull kickstand 21 is disposed in the rotating slot 25, the other end of the pull kickstand 21 is hinged to the middle of the abutting kickstand 22, one end of the abutting kickstand 22 is slidably disposed in the first slot 23 or the second slot 24, and the pull kickstand 21 pulls the abutting kickstand 22 to move in the first slot 23 or the second slot 24.

When pulled, the pull kickstand 21 drives the abutting kickstand 22 to slide in the second slot 24; because the length of the second slot 24 is less than that of the first slot 23, the abutting kickstand 22 abuts against a tail end of the second slot 24, at this moment, the abutting kickstand 22, a desk and the fixing structure 1 form a stable triangle to support and stabilize the terminal device. When the pull kickstand 21 is pulled again, the abutting kickstand 22 slides into the first slot 23 from the second slot 24, and the abutting kickstand 22 and the pull kickstand 21 are hidden in the match groove 11, so that the protective casing occupies a small space.

In this technical solution, the pull kickstand 21 is pulled twice to drive the abutting kickstand 22 to slide in the first slot 23 and the second slot 24 alternately to realize a support and storage effect.

Further, a torsion spring 26 is disposed at an end, connected to the abutting kickstand 22, of the pull kickstand 21, one end of the torsion spring 26 is connected to the pull kickstand 21, and the other end of the torsion spring 26 is connected to the abutting kickstand 22. The torsion spring 26 is arranged to provide an acting force between the pull kickstand 21 and the abutting kickstand 22. Specifically, when the torsion spring 26 is compressed, the abutting kickstand 22 is located in the second slot 24, and at this moment, an acting force exits between the abutting kickstand 22 and the pull kickstand 21 to stabilize the abutting kickstand 22 and the pull kickstand 21. When the torsion spring is stretched, the abutting kickstand 22 is located in the first slot 23, the torsion spring 26 pulls the abutting kickstand 22 to slide in the first slot 23 until the abutting kickstand 22 abuts against the tail end of the first slot 23, and the abutting kickstand 22 and the pull kickstand 21 are automatically stored in the match groove 11 by the torsion spring 26. Preferably, the length of the match groove 11 is greater than that of the abutting kickstand 22, and the length of the first slot 23 is greater than a distance from a joint of the pulling kickstand 21 and the abutting kickstand 22 to the end, slidably connected to the first slot 23, of the abutting kickstand 22, so that the pull kickstand 21 and the abutting kickstand 22 are horizontally hidden in the match groove 11.

Further, to enable the abutting kickstand 22 to slide in the first slot 23 and the second slot 24 more smoothly, the first slide 23 and the second slot 24 are arranged in parallel, and a slope towards the first slot 23 is disposed at the tail end of the second slot 24.

In another embodiment, the fixing structure 1 comprises an inner chuck 12 and an outer chuck 13, wherein the inner chuck 12 is used for clamping the terminal device and is made of rigid plastic, the outer chuck 13 is made of rubber and is used for clamping the inner chuck 12, and buffer gaskets 19 are disposed between the inner chuck 12 and the outer chuck 13.

A through hole 14 is formed in the inner chuck 12 and is step-like, and the driven plate 16 is disposed in the through hole 14 and penetrates through the inner chuck 12 and the outer chuck 13 to be connected to the driving plate 15. The match groove 11 is formed in the driving plate 15.

In this embodiment, the match groove 11 is formed in the driving plate 15, and the driving plate 15 is rotatable, so that the abutting kickstand 22 is able to rotate at any angle, and the terminal device may be supported in a landscape mode or a portrait manner.

Further, limit grooves 17 are further formed in a side wall of the through hole 14 in a ring array, and limit arms 18 are disposed on the driven plate and are clamped in the limit grooves 17. When the driven plate 16 is rotated, the limit arms 18 sequentially contact with the corresponding limit grooves 17, and users may feel an obvious sense of obstruction when rotating the driven plate 16, and thus can know the adjustment angle. The driving plate 15 and the driven plate 16 are prevented from sliding through the cooperation of the limit grooves 17 and the limit arms 18.

Preferably, the driving plate 15 and the driven plate 16 are connected through bolts. The buffer gaskets 19 are disposed above and below the through hole 14.

Further, to enable the protective casing to be held stably, grip straps 20 (not shown) are disposed on the driving plate 15, two ends of the two grip straps 20 are disposed on two sides of the match groove 11 respectively, and hook and loop fasteners are disposed on the two grip straps 20 and may be bonded together. Preferably, projections of the two grip straps 20 on the driving plate 15 are perpendicular to a projection of the abutting kickstand on the driven plate 16, so that the abutting kickstand 22 may be folded and unfolded without being affected by the grip straps 20.

What is claimed is:

1. A protective casing for a terminal device, comprising:
   a fixing structure for fixing a terminal device, wherein a match groove is formed in a back of the fixing structure, the fixing structure comprises an inner chuck for clamping the terminal device and an outer chuck for clamping the inner chuck; and
   a support structure comprising a kickstand structure, wherein the kickstand structure is disposed in the match groove and comprises a pull kickstand and an abutting kickstand;
   a first slot and a second slot are formed in a side wall of an end of the match groove, a length of the first slot is greater than that of the second slot, a tail end of the first slot is connected with the second slot, a rotating slot is formed in a side wall of another end of the match groove, the pull kickstand has an end disposed in the rotating slot and an end hinged to a middle of the abutting kickstand, an end of the abutting kickstand is slidably disposed in the first slot or the second slot, and the pull kickstand pulls the abutting kickstand to move in the first slot or the second slot.

2. The protective casing for the terminal device according to claim 1, wherein a torsion spring is disposed at an end, connected to the abutting kickstand, of the pull kickstand, and has an end connected to the pull kickstand and an end connected to the abutting kickstand.

3. The protective casing for the terminal device according to claim 2, wherein the rotating slot has a sliding-in end and a rotating end, the sliding-in end is disposed on the side wall of the match groove and is connected with the rotating end, and the pull kickstand is rotatably disposed at the rotating end.

4. The protective casing for the terminal device according to claim 3, wherein the first slot and the second slot are arranged in parallel, the length of the first slot is greater than that of the second slot, and a slope towards the first slot is disposed at a tail end of the second slot.

5. The protective casing for the terminal device according to claim 4, wherein, a through hole is formed in the inner chuck and is step-like, the support structure further comprises a rotary plate assembly, the rotary plate assembly comprises a driving plate and a driven plate, the driven plate is disposed in the through hole, abuts against the through hole and penetrates through the inner chuck and the outer chuck to be connected to the driving plate, and the match groove is formed in the driving plate.

6. The protective casing for the terminal device according to claim 5, wherein limit grooves are formed in a side wall of the through hole in a ring array, and limit arms are disposed on an outer edge of the driven plate and are clamped in the limit grooves.

7. The protective casing for the terminal device according to claim 6, wherein the driving plate and the driven plate are connected through bolts.

8. The protective casing for the terminal device according to claim 5, wherein buffer gaskets are disposed between the inner chuck and the outer chuck and are located above and below the through hole.

9. The protective casing for the terminal device according to claim 5, wherein the driving plate is further provided with grip straps, and two ends of the grip straps are disposed on two sides of the match groove respectively.

10. The protective casing for the terminal device according to claim 9, wherein two said grip straps are arranged and are provided with hook and loop fastener.

* * * * *